United States Patent [19]

Anderson

[11] Patent Number: 4,522,020
[45] Date of Patent: Jun. 11, 1985

[54] WHEAT COMBINE

[76] Inventor: Steven A. Anderson, Star Route, Arlington, Oreg. 97812

[21] Appl. No.: 616,903

[22] Filed: Jun. 4, 1984

[51] Int. Cl.$^3$ ............................................ A01D 75/28
[52] U.S. Cl. ..................................................... 56/209
[58] Field of Search ............ 56/208, 209, 210, DIG. 3, 56/DIG. 10

[56] References Cited

U.S. PATENT DOCUMENTS

| | | | |
|---|---|---|---|
| 1,859,219 | 5/1932 | Raney et al. | 56/208 |
| 1,914,698 | 6/1933 | Mainland et al. | 56/208 |
| 2,504,289 | 4/1950 | Waterman | 56/209 |
| 2,509,357 | 5/1950 | Krause | 56/208 |
| 2,750,728 | 6/1956 | Bailey | 56/209 |
| 2,753,675 | 7/1956 | Harp | 56/209 |
| 2,821,059 | 1/1958 | Heitshu | 56/209 |
| 3,537,243 | 11/1970 | Bichel | 56/208 |

Primary Examiner—Gene Mancene
Assistant Examiner—John G. Weiss

Attorney, Agent, or Firm—Kolisch, Hartwell & Dickinson

[57] ABSTRACT

The present invention provides a combine of the type having a laterally extending header with proximal and distal ends, and a wheel/feeder separator assembly extending rearwardly from the header. The invention includes the following components: a circle mounted to the header adjacent a rearward facing portion of the proximal end for facilitating pivoting of the header along a longitudinal axis extending through the center of the circle; a frame member pivotally mounted to and extending laterally outwardly from the feeder/separator assembly to support the distal header end, the frame member defining a frame member pivot axis extending at a rearwardly converging angle with respect to the longitudinal axis; and a header support wheel rotatably mounted to the frame member and disposed laterally outwardly from the frame member pivot axis for supporting weight from the header.

9 Claims, 4 Drawing Figures

WHEAT COMBINE

BACKGROUND OF THE INVENTION

This invention relates generally to agricultural harvesting equipment, and more particularly to an improved wheat harvesting combine.

Combines have for many years been used to harvest wheat. They may be either of the self-propelled type in which the propulsion unit is a part of the combine, or may be designed to be pulled by a tractor or other vehicle. In any event, combines typically include a sickle which has a multiplicity of reciprocating cutting teeth, and a header which defines a trough and a rotary shaft or auger which collects the cut wheat and feeds it to a central or laterally offset feeder. The feeder then feeds the wheat rearwardly through a threshing/separating system which separates the grain from the rest of the plant, and the grain is accumulated in a grain tank.

Pulled combines are typically of cantilevered construction with the feeder housing being positioned at one lateral end of the header. This is desirable, if not necessary, because the pulling vehicle should be disposed to one side of the combine so that the wheat which is being harvested is not matted down by the wheels of such vehicle. This cantilevered construction normally limits the length of the header and therefore the width of swathe which is being cut. Self-propelled combines, which centrally support the header, permit wider swathes to be cut but are far more expensive than pulled combines because an entire propulsion system, including an operation station, must be included.

Another important design consideration with combines is the extent to which the header follows undulations in the terrain which is being traversed. Some combines are designed exclusively for use on relatively flat terrain. Other combines, commonly know as hillside combines, are designed to follow substantial changes in the terrain. Such combines, which are typically self-propelled, are normally provided with a so-called circle which is mounted adjacent the feeder housing to permit relative rotation between the feeder housing and the header. Because the feeder housing is, with such self-propelled combines, centrally located rather than at one lateral end or the other of the header, upward movement of either end results in downward movement at the other end. This is undesirable because it results in uneven cutting.

Some types of combines, such as belt pick up types, include a wheel adjacent each end of the header. This is possible with a pick up combine because it is merely picking up the wheat which has been cut. With direct-cut headers which simultaneously cut and pick up the wheat, such wheels would not be permissible because one of the wheels would be rolling over wheat which has not yet been cut.

There have been many prior attempts to design header support systems which permit the length of the header to be increased. One such design is presented in U.S. Pat. No. 4,359,854 to Witzel. This patent discloses an outrigger-type support having a plurality of wheels behind the header of a pulled combine. Another Witzel patent, U.S. Pat. No. 4,329,833, discloses a self-propelled combine in which the feeder housing is centrally disposed on the header, and a plurality of outrigger-type wheeled supports are provided on each side of the propulsion unit. In both Witzel patents the header is permitted to swivel upwardly and downwardly along a horizontal, longitudinal axis as the header passes over undulations in the contour of the ground. Both headers are also mounted to swivel about a vertical axis so that they may be swung out of the way for roadway travel. However, the means by which the header is mounted to the outrigger-type supports it is not adequately disclosed and does not appear to permit the vertical movement which would normally take place as the header is pivoting. The combines disclosed in the Witzel patents are also relatively complicated, resulting in substantial initial and operating costs.

Yet another drawback of the combine disclosed in U.S. Pat. No. 4,359,854 is that a driven chute must be disposed between the header and the feeder to convey wheat therebetween. This presents an obstruction in the flow of wheat and requires additional energy input.

It is therefore an object of the present invention to overcome the drawbacks and limitations of the prior art proposals. More specifically, the invention has as its objects the following: (1) to provide a pulled combine having a header which is as wide as those of the self-propelled type, thereby dramatically increasing the rate at which wheat can be harvested; (2) to develop a combine which is suitable to operate on either flat or hilly terrain; (3) the provision of a pulled combine which has sufficient structural integrity that it may be used with rough terrain without maintenance problems; (4) to provide a combine which permits the header to be pivoted with respect to the feeder housing without adverse stress occurring in the components thereof; (5) to provide a combine in which wheat is permitted to flow directly from the header into the feeder housing without requiring the use of any intermediate drive means; and (6) to develop a hillside, pulled combine which is easily adjustable to different cutting heights without requiring complex drive cylinder arrangements, cables, or the like.

SUMMARY OF THE INVENTION

The present invention achieves the above objects by providing a combine of the type having a laterally extending header with proximal and distal ends, and a wheeled feeder/separator assembly extending rearwardly from the header. The improvement comprises circle means mounted to a rearward facing portion of the inner header end for facilitating pivoting of the header along a longitudinal axis extending through the center of the circle means, a laterally extending frame member pivotally mounted to the feeder/separator assembly along a frame member pivot axis, and a header support wheel disposed laterally outwardly or distally from the frame member pivot axis for supporting the weight of the header. The frame member pivot axis normally extends at a rearwardly converging angle with respect to the longitudinal axis. The invention normally also includes vertical pivot means defining a substantially vertical pivot axis disposed adjacent an outer or distal end of the circle means to permit the header to pivot along a vertical axis as the combine passes over undulations in the terrain which cause the frame member to pivot upwardly and downwardly with respect to the feeder/separator assembly.

DETAILED DESCRIPTION OF THE PREFERRED EMBODIMENT

Figure 1:
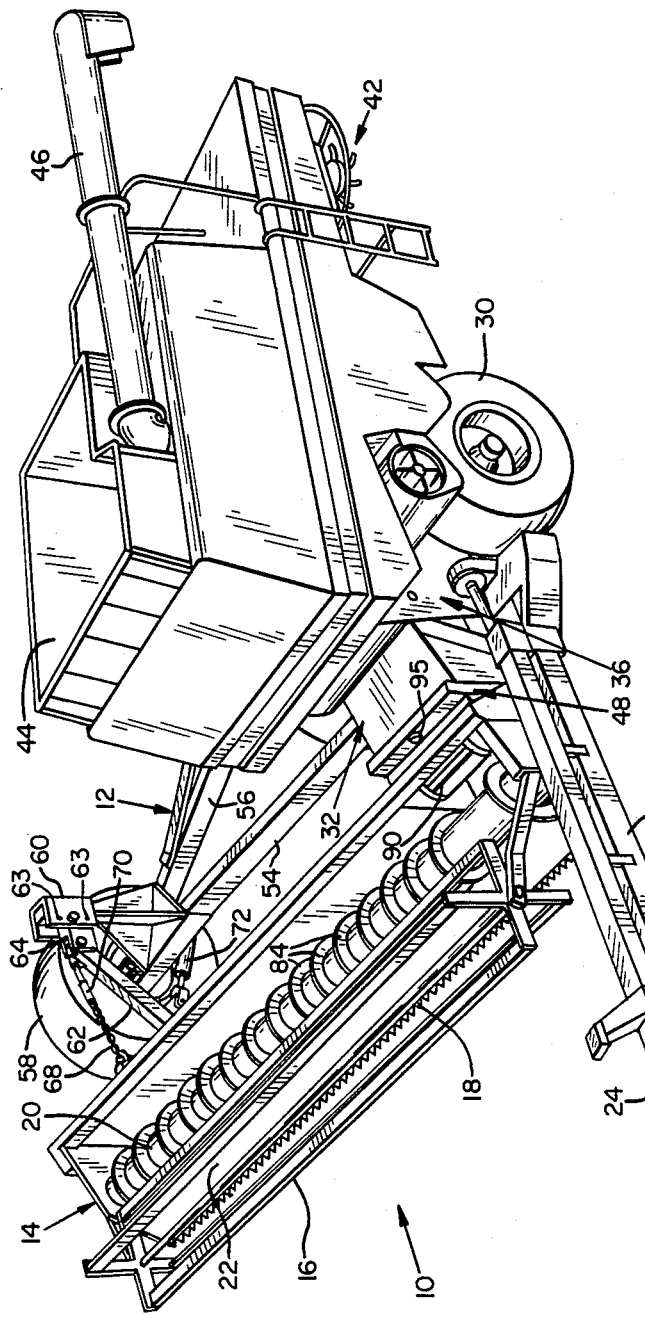
FIG. 1 is a perspective view of one embodiment of the present invention.
Figure 2:
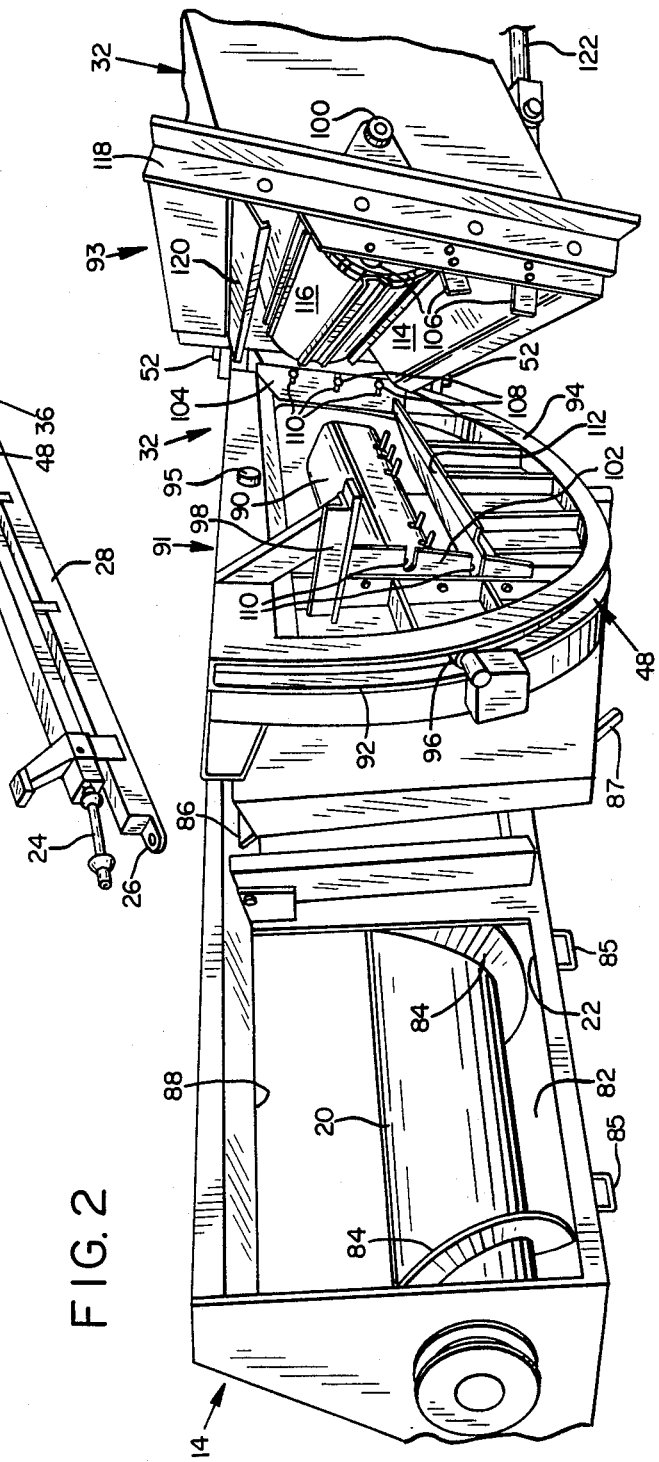
FIG. 2 is an exploded, perspective view showing the auger, the feeder assembly, and some of the components of the circle of the embodiment of FIG. 1.
Figure 3:
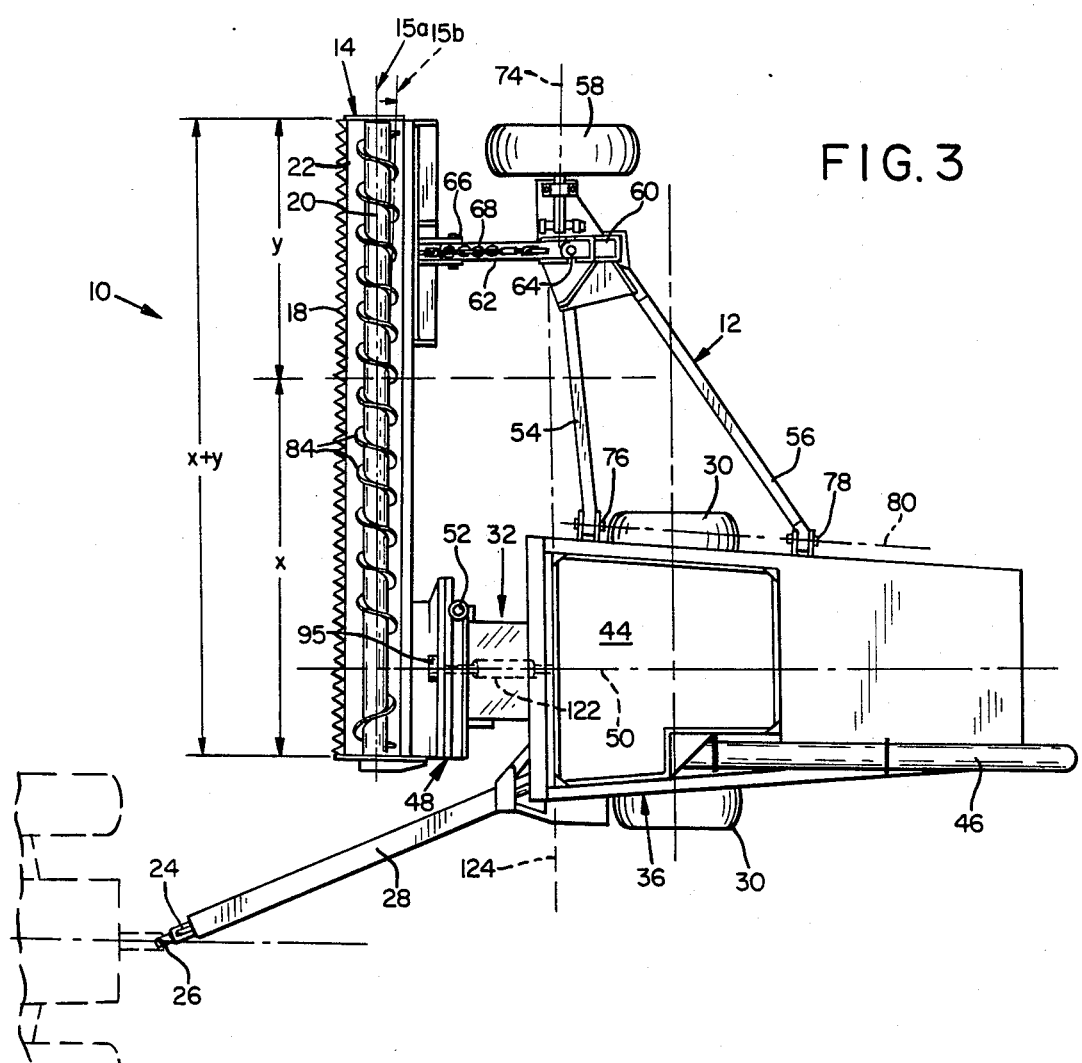
FIG. 3 is a top plan view of the embodiment of FIG. 1.
Figure 4:
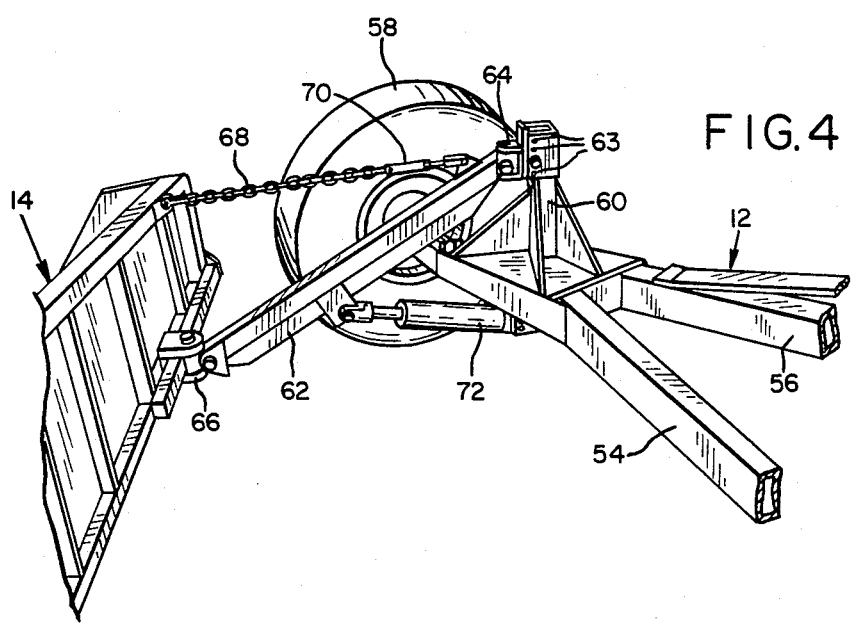
FIG. 4 is a fragmentary perspective view of the outrigger wheel, the remote end of the header, and associated structure.

One form which the invention may take is depicted in FIGS. 1–4 and is identified generally with the numeral 10. The depicted combine 10 is of the pulled, direct-cut type and is conventional in design in many respects. The novel features are associated with the support assembly 12 for header 14. Header 14 is convention except that it is longer than conventional headers for pull-type combines. This increased length feature is shown in FIG. 3 with the length x being the normal header length of a pulled combine, which is typically no more than about 18 feet. The length y is shown as the increased length which may be added with the present invention, so that x+y may be as much as 30 feet or more.

Header 14 includes a conventional rotatable reel 16, a reciprocating sickle 18, and a rotating auger 20 disposed within a trough 22 to rotate on an auger axis 15a. As with all pulled combines, a drive shaft 24 is provided which extends rearwardly from the pulling vehicle (not shown), and is mounted to a hitch 26 and a hitch frame assembly 28. Driving power from the pulling vehicle is thus provided to auger 20, the feeder assembly 32, the thresher (not shown), and the separator 36, all of which are of well known design. The feeder assembly, thresher and separator will sometimes be referred to herein as the feeder/separator assembly. Disposed above separator 36 is a grain tank 44 with an unloader tube 46 extending therefrom.

The unique aspects of combine 10 will now be discussed. As mentioned above, the novelty of this design centers around support assembly 12. This assembly permits header 14 to be longer than previously possible with pulled combines. Support assembly 12 cooperates with a circle 48 which allows header 14 to pivot along a longitudinal circle axis 50 as header 14 undulates with changes in the terrain. Circle 48 is of conventional design and is commonly used in International Harvester's 1470 series self-propelled hillside combines. The use of a circle with the present type of pulled combine is, however, novel.

A vertical pivot joint 52 is provided adjacent a distal end of circle 48. This joint is necessary in the depicted embodiment for purposes which will become evident as this description continues.

Support assembly 12 includes a first frame member 54 and a second frame member 56, both of which extend outwardly or distally from the housing of separator 36 toward an outrigger wheel 58. First and second frame members 54 and 56 intersect at an outrigger frame post 60 which extends upwardly to provide an appropriate mounting for header 14. A header mounting arm 62 extends obliquely from the upper end of outrigger frame post 60, to adjacent the lower portion of header 14, and is provided with a first and a second universal joints 64 and 66. First universal joint 64 of header mounting arm 62 may be positioned in any one of three vertical positions depending upon which of three positioning holes 63 is used to pin the joint to frame post 60.

A header mounting chain 68, sometimes referred to herein as post/header connection means, also normally extends between this distal end of header 14 and first universal joint 64, in order to provide additional stability to the header. In the depicted embodiment, header mounting chain 68 is provided with a turnbuckle 70 which can adjust the tension of the chain. In some applications, header 14 may be sufficiently rigid that header mounting chain 68 may be deleted.

A header mounting arm hydraulic cylinder 72 extends between a point below outrigger frame post 60 and header mounting arm 62 to permit the height of header 14 to be varied. The operation of this cylinder is coordinated with the operation of a similar cylinder, to be described below, which is disposed at the opposite or proximal end of header 14.

Outrigger wheel 58 is normally somewhat lighter than drive wheels 30, but is typically the same diameter, and is provided with a suitable axle, bearings, and the like. The axis of rotation of outrigger wheel 58 extends parallel to header 14 and is identified in FIG. 3 with the numeral 74.

The proximal ends of first and second frame members 54 and 56 mount to the housing of separator 36 at a pair of pivot joints 76 and 78. These pivot joints 76 and 78 are aligned along a pivot joint axis 80 which extends at an angle which is rearwardly converging on longitudinal pivot axis 50.

Circle 48 and feeder assembly 32 will now be described. FIG. 2 shows feeder assembly 32 in a position in which the assembly has been pivoted open along vertical pivot joint 52 to an extent far greater than would be possible during normal operation of combine 10, in order to show the appropriate structure. FIG. 2 also shows the adjacent end of auger 20 in an opened or exploded view in order to permit a discussion of that structure.

Following the path of the wheat through the apparatus, the rotation of auger 20 and its vanes 84 causes wheat to collect in a space 82 below the auger. The continuing rotation of auger 20 feeds the wheat into the feed assembly 32. Normally, feed assembly 32 is engaged by header 14 by a feeder assembly lip 86 which fits under, and is engaged by, an engagement edge 88 extending along the upper edge of header 14. During use, a pair of latches 87 (only one of which shows in FIG. 2) engage a corresponding pair of grommets 85 to hold the assembly together.

The wheat is then engaged by a conventional feeder beater 90. Circle 48 is, in the depicted embodiment, positioned immediately downstream of feeder beater 90 and is designed to permit relative rotation along pivot point 95 between a forward portion 91 of feeder assembly 32 and a rearward portion 93 thereof, vertical pivot joint 52 being mounted between such portions. To permit relative rotation between such portions, first and second circle members 92 and 94 are provided with a circle roller 96 which is mounted to circle member 92 but which rolls along second circle member 94 as in conventional designs.

Extending rearwardly from circle assembly 48 is a vertical thrust absorbing rail 98 which cooperates with an idler roller 100 to absorb downward thrusts on forward portion 91 or upward thrusts upon rearward portion 93 of feeder assembly 32. Because pivoting along vertical pivot joint 52 normally does not exceed 5 degrees, idler roller 100 is in contact at all times with vertical thrust rail 98.

To prevent leakage of wheat from feeder assembly 32, a first and a second seal plate 102 and 104 extend rearwardly from the forward portion 91, and which are engaged by complementing guide plates 106. Each guide plate 106 is provided with an adjacent but spaced seal bolt 108. Referring to FIG. 2, guide plates 106 appear in the foreground of the rearward portion 93, each guide plate being aligned with a seal plate slot 110. An upper seal plate slot is disposed behind vertical thrust absorbing tail 98, and this slot is aligned with the upper foreground seal bolt which is identified with the numeral 106 because it does not include a separate guide plate. The other seal bolts 108, which appear only in the background of FIG. 2, are spaced from guide plates 106 so that first and second seal plates 102 and 104 can fit between the seal bolts and the guide plates at the seal plate slots. Again, because the opening of feeder assembly 32 is normally not more than about 5 degrees, the guide plate/seal bolt assembly always engages the seal plates to ensure alignment thereof and to prevent leakage of wheat therefrom.

The lower portion of feeder assembly 32 is sealed by a belt-type seal 112 which is comprised of flexible belting and which complements an upwardly sloping floor 114 disposed below a cutter roll 116 in the rearward portion 93 of feeder assembly 32. Thus, as the wheat passes through feeder beater 90, it is directed across belt seal 112 and onto sloping floor 114 where it comes into contact with cutter roll 116. Because of the sliding but sealed fit between belt seal 112 and sloping floor 114, there is no leakage of wheat even if the pivoting along vertical pivot joint 52 is as much as 5 degrees.

The limited pivoting is not visible from the exterior of circle 48, but is shown diagrammatically in FIG. 3 at the remote end of header 14 with pivoted auger axis line 15b.

The rearward portion 93 is provided with a frame 118 which ensures the structural integrity of this portion of the feeder assembly. A forward and downwardly extending lip 120 covers most of the gap between the forward and rearward portions of feeder assembly 32.

FIG. 2 also shows a feeder assembly hydraulic cylinder 122 which extends between rearward portion 93 and the housing of separator 36 to control the pivoting between these two members. A conventional pivot connection is provided between feeder assembly 32 and the housing separator 36 but is not depicted and will not be described. Such pivoting takes place along a transversely extending axis 124 which is parallel to the axis 74 of rotation of outrigger wheel 58. Feeder assembly hydraulic cylinder 122 is hydraulically in series with header mounting arm hydraulic cylinder 72 so that the two ends of header 14 will be maintained at the same level at all times regardless of loading differentials between the two ends of header 14.

OPERATION OF THE DEPICTED EMBODIMENT

The operation of the depicted embodiment will now be described. As mentioned above, the actual harvesting operation is conventional with the exception of the capabilities which combine 10 has in moving over uneven terrain. Therefore, this discussion will center upon the operation of the various components as the combine moves over such terrain.

As combine 10 is being pulled and wheat harvesting operations are taking place, header 14 is permitted to pivot along longitudinally extending circle axis 50 because rotation between the first and second circle members 92 and 94 is permitted. This rotation will have no effect upon the wheat which is being directed from auger 20 through feeder assembly 32 and into separator 36 because of the various seals disposed within and adjacent to the feeder assembly. The rotational displacement of header 14 is controlled by the pivoting along pivot axis 80 of first and second frame member pivot joints 76 and 78. Pivot joint axis 80 does not coincide with circle axis 50 so as support assembly 12 pivots upwardly and downwardly, the distal end of the support assembly moves toward separator 36 at a faster rate than does the distal end of header 14. This causes angulation in header mounting arm 62 (looking at the arm in plan such as in FIG. 3) which tends to draw the distal end of header 14 slightly rearwardly. Such movement is permitted by vertical pivot joint 52. The pivoted position is shown by pivoted auger axis line 15b in FIG. 3.

The extent of pivoting is reduced by the angulation between pivot joint axis 80 and longitudinal circle axis 50. In fact, it may be possible to eliminate vertical pivot joint 52 altogether, with the angulation between axes 50 and 80 such that upward or downward pivoting of support assembly 12 causes the distal end of the support assembly to move forwardly at the same rate that angulation (in plan) is developing in header mounting arm 62. This embodiment has not been depicted but would be identical to combine 10 except for the deletion of vertical pivot joint 52 and the structure associated with circle 48 which facilitates such pivoting movement.

In addition to providing the pivot capability described above, combine 10 also permits the height of header 14 to be adjusted through the use of header mounting arm hydraulic cylinder 72 and feeder assembly hydraulic cylinder 122. To raise or lower header 14, these cylinders are either extended or retracted through a common hydraulic line so that the header will always extend parallel to the ground.

The invention thus provides a combine which is versatile in that it is suitable for use on hilly terrain, and has far greater harvesting capabilities than prior art pulled combines because of the wide swathe which can be cut. The swathe is comparable to that provided by self-propelled combines, at substantially less cost. The combine is quite simple and therefore is inexpensive to construct and maintain.

In an alternate embodiment of the invention which has not been depicted, the pivot joint axis 80 is precisely parallel to circle axis 50. However, this is not the preferred embodiment because the degree of pivoting along vertical pivot joint 52 will be more exaggerated than with combine 10.

Other changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

It is claimed and desired to secure by Letters Patent:

1. A pulled combine of the type having a laterally extending header with proximal and distal ends, and a wheeled feeder/separator assembly extending rearwardly from said header, wherein the improvement comprises:

circle means mounted to said header adjacent a rearward facing portion of said proximal end, for facilitating pivoting of said header along a longitudinal axis extending through the center of said circle means;

a frame member pivotally mounted to and extending laterally outwardly from said feeder/separator assembly to support said distal header end, said frame member defining a frame member pivot axis extending at a rearwardly converging angle with respect to said longitudinal axis;

header support wheel means rotatably mounted to said frame member and disposed laterally outwardly from said frame member pivot axis for supporting weight from said header; and vertical pivot means defining a substantially vertical pivot axis disposed adjacent said circle means for facilitating the pivoting of said header as said frame member pivots upwardly and downwardly along said frame member pivot axis.

2. The combine of claim 1, wherein a second frame member is provided, also extending from and pivotally mounted to said feeder/separator along said frame member pivot axis.

3. The combine of claim 1, further comprising means for displacing said header upwardly and downwardly along a transversely extending axis to permit the height of said header from the ground to be controlled, said displacing means including a pair of hydraulic cylinders, one of which is displaced adjacent said feeder/separator assembly below said circle means, and the other of which is disposed adjacent one of said frame members.

4. The combine of claim 2, further comprising an upright header mounting post extending from at least one of said frame members adjacent said header support wheel means, and an included header support arm extending between said header mounting post and said header, and wherein said other of said hydraulic cylinders extends between said header support arm and a point adjacent said header mounting post.

5. The combine of claim 3, wherein said header support arm extends between an upper end of said header mounting post and a lower portion of said distal header end, and further comprising elongate, adjustable post-/header connection means extending between said upper end of said header mounting post and an upper portion of said distal header end.

6. A combine comprising:
a laterally extending header having proximal and distal ends;
circle means mounted to a rearward facing portion of said header adjacent said proximal end thereof facilitating pivoting of said header along a longitudinal axis extending through the center of said circle means;
a wheeled feeder/separator assembly disposed rearwardly of said circle means to receive cut wheat from said proximal end of said header;
a frame member extending laterally outwardly from said feeder/separator assembly and being pivotally mounted thereto along a frame member pivot axis, said frame member having proximal and distal ends;
frame member wheel means disposed adjacent said distal frame member end;
a header support arm extending between said distal header end and said distal frame member end to provide support to said distal header end; and
vertical pivot means disposed adjacent a distal side of said circle means for facilitating pivoting of said header as said frame member pivots.

7. The combine of claim 6, wherein said frame member pivot axis extends parallel to said longitudinal axis.

8. The combine of claim 6 wherein said frame member pivot axis extends at an oblique angle with respect to said longitudinal axis.

9. The combine of claim 8 wherein said frame member pivot axis extends at a rearwardly converging angle with respect to said longitudinal axis.

* * * * *